United States Patent [19]

McMahon

[11] Patent Number: 5,093,677
[45] Date of Patent: Mar. 3, 1992

[54] APPARATUS FOR MOUNTING A REMOTE CONTROLLED, GYRO-STABILIZED CAMERA EXTERNALLY ON A HELICOPTER

[76] Inventor: Brian McMahon, 8351 Ronda Dr., Canton, Mich. 48187

[21] Appl. No.: 662,182

[22] Filed: Feb. 28, 1991

[51] Int. Cl.⁵ ............... G03B 39/00; B64C 27/00
[52] U.S. Cl. .................................. 354/74; 354/81; 354/293; 244/17.11; 244/118.2; 244/129.6
[58] Field of Search ............. 354/81, 293, 65, 70, 354/74; 244/129.6, 118.1, 118.2, 17.11

[56] References Cited

U.S. PATENT DOCUMENTS

| | | | |
|---|---|---|---|
| 3,604,660 | 9/1971 | Marley | 244/17.11 |
| 4,114,839 | 9/1978 | Sibley et al. | 354/74 |
| 4,752,791 | 6/1988 | Allred | 354/81 |

Primary Examiner—W. B. Perkey
Assistant Examiner—Cassandra C. Spyrou
Attorney, Agent, or Firm—Charles W. Chandler

[57] ABSTRACT

A truss-type structure for supporting a relatively large, heavy gyro-stabilized camera pod in a position forward of a helicopter nose, is connected to the brackets normally used for mounting the helicopter's steps. A counter-weight is internally mounted in the helicopter fuselage.

12 Claims, 3 Drawing Sheets

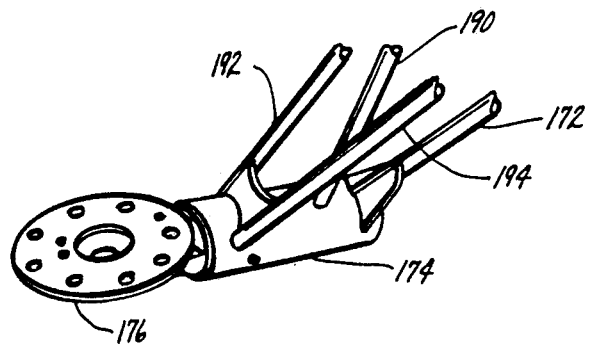
fig. 3
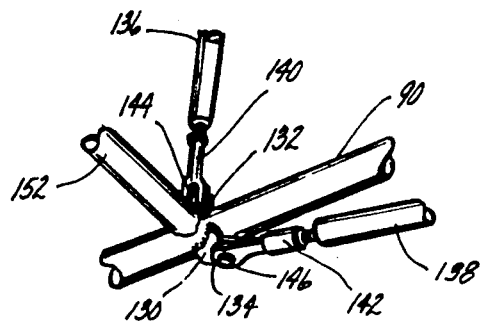
fig. 4
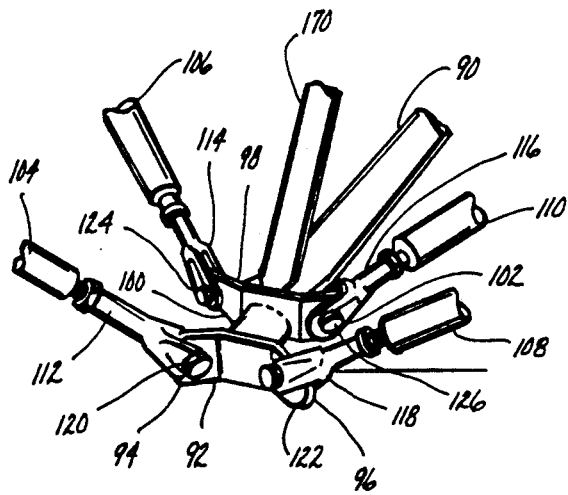
fig. 5
fig. 6

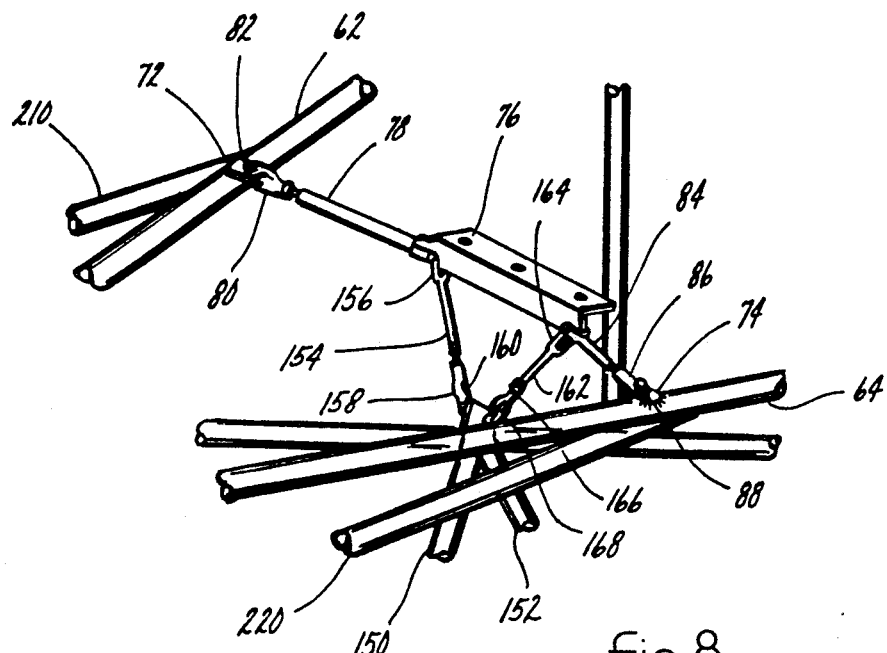
fig. 8
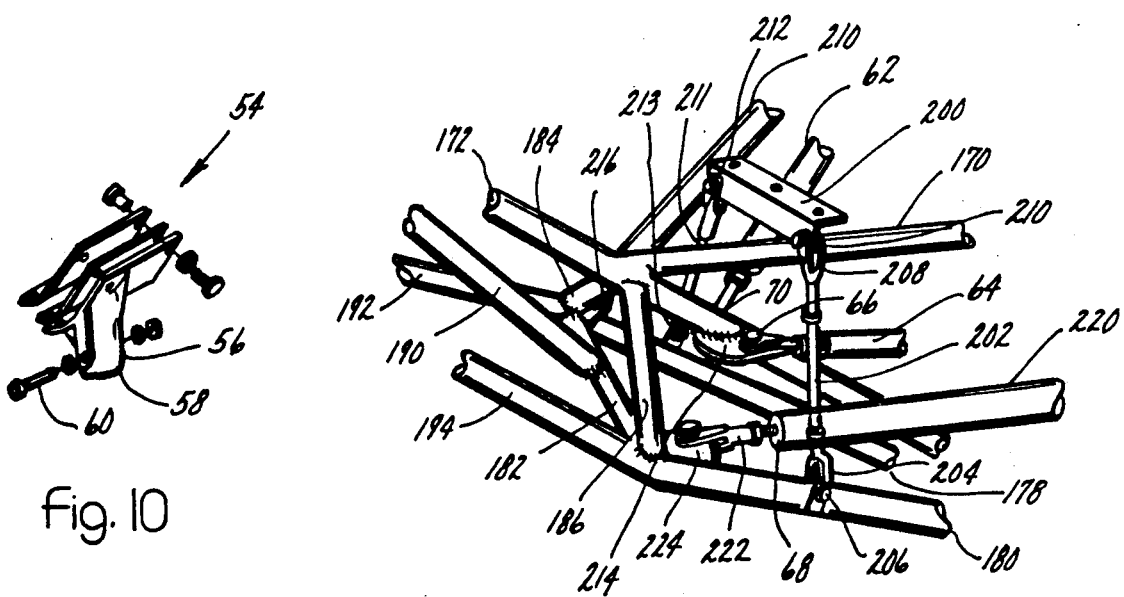
fig. 10
fig. 9

APPARATUS FOR MOUNTING A REMOTE CONTROLLED, GYRO-STABILIZED CAMERA EXTERNALLY ON A HELICOPTER

BACKGROUND OF THE INVENTION

This invention is related to a frame for supporting a gyro-stabilized film or video ball-type camera system in front of the nose of a helicopter.

A sophisticated, gyro-stabilized camera system employing a ball-shaped pod is frequently mounted on a helicopter for aerial use. The pod is conventionally installed on a side mount. A side mount has several disadvantages. For example, both rear doors on the side of the helicopter on which the pod is mounted, must be removed, leaving an opening. The opening sometimes permits loose items to fall out of the helicopter during the flight, and exposes the occupants and equipment to cold and damp air.

Side-mounted pods reduce maximum airspeed of helicopters by increasing air resistance. In addition, a side-mounted camera can pan (rotate) only about 140 degrees before parts of the aircraft get in the camera's line of vision. The pod's ability to tilt up or down also limits the camera's view because of the landing gear (skids) and rotor blades. In some instances, it is necessary to use a side-mounted camera on the opposite side of the helicopter. The supporting apparatus must be disassembled and remounted on the other side of the helicopter.

A typical gyro-stabilized camera is sold or rented under the trademark "WESCAM". Such a camera is usually remote-controlled from the operator's console within the helicopter cabin.

SUMMARY OF THE INVENTION

The broad purpose of the present invention is to provide an apparatus for mounting a WESCAM or similar type of gyro-stabilized, ball-type camera system on the nose of a helicopter, such as a Bell Jet Ranger or a Bell LongRanger helicopter. The preferred apparatus has a truss type frame suspended beneath the fuselage, from the existing step-mounting brackets. The frame has a forward section which supports the pod in a position forward of the helicopter nose, within the line of vision of the pilot. The frame does not require any modification of the helicopter other than removal of the conventional steps. The helicopter must be equipped with high skid gear.

The preferred nose mount allows the camera operator to double the camera's field of view. On a 45 degree down angle, the pod can be rotated a full 360 degrees without any obstructions by the fuselage of the helicopter. On the horizontal plane, the field of view is approximately 300 degrees or more than double the normal 140 degrees available with a side-mount. The pod never has to be switched to the other side of the helicopter.

The preferred nose mount permits a higher air speed when filming, giving the helicopter an additional 25-35 m.p.h. more air speed over conventional side-mounted camera systems. The camera's forward location creates less drag than a side-mounted camera. The preferred frame weights less than half a conventional side-mounted frame. The nose mount installation keeps the weight of the camera system centered along the longitudinal axis of the aircraft. This keeps the helicopter within all center of gravity limits without the imbalance or drag caused by either an external counter-weight, or a camera ball mounted on the side of the fuselage.

The preferred nose mount enhances safety because it is installed where the pilot can see the pod. It allows normal flight air speeds and attitudes because you do not need to remove the doors of the helicopter for installation. This reduces the chance of loose equipment falling out of the door opening during flight, and allows all doors to be used for emergency exit. The counter-weight is fully internally mounted for added safety and less drag.

No other nose-type camera mount for a large gyro-stabilized camera system is believed to be commercially available, only apparatus for installing small, externally-mounted ground, infrared or surveillance cameras.

One such mounting system of the prior art was disclosed in U.S. Pat. No. 3,604,660 which was issued to Eugene I. Marley, Sept. 14, 1971. However, the Marley device has an externally-mounted counter-weight, and is attached to the helicopter by a mounting frame located in the helicopter cabin, in the location the rear seat cushion usually occupies. The frame has arms that require that holes be cut either in the cabin or the rear cabin doors. The present invention requires no modification of the cabin structure.

U.S. Pat. No. 4,752,791 which was issued June 21, 1988 to Charles N. Allred, discloses another helicopter camera mounting system. However, such a system would be unsuitable for a gyro-stabilized camera pod of the type to which the present invention is directed.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 3 is an upside-down view of the circular plate which connects the camera pod to the nose-mount frame;

FIG. 4 is a view illustrating the manner in which the lower ends of the forward trusses are connected to the lower nose mount frame member;

FIG. 5 is a rear view illustrating the manner in which the lower end of the trusses suspended from the existing step brackets, are connected to the rear end of the lower frame member;

FIG. 6 illustrates the tubular insert which is received in one of the helicopter's existing step brackets;

FIG. 8 is a view illustrating the manner in which the upper and lower nose-mount frame members are attached to a bracket connected to the helicopter nose;

FIG. 9 is a view showing the manner in which the forward end of the upper frame member is connected to the lower frame member; and FIG. 10 is an exploded view of a typical existing step bracket.

DESCRIPTION OF THE PREFERRED EMBODIMENT

Figure 1:
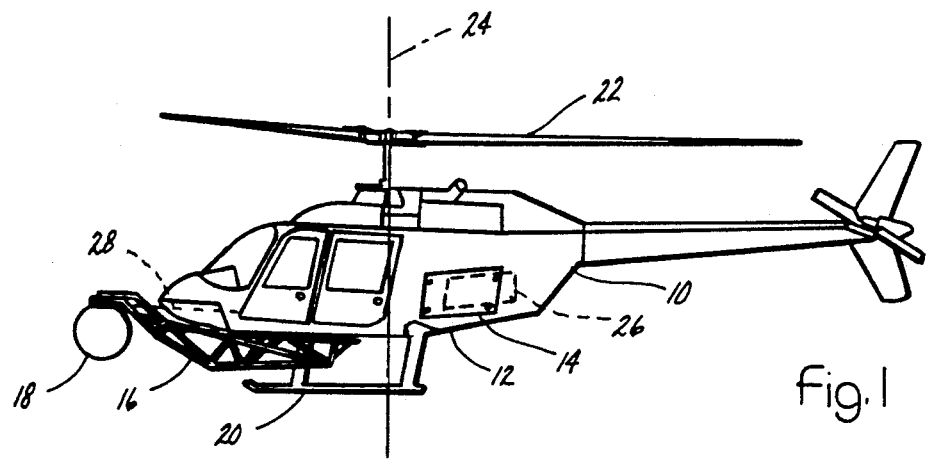
FIG. 1 illustrates a helicopter having a preferred nose mount supporting a gyro-stabilized camera pod in accordance with the invention.

Referring to the drawings, FIG. 1 illustrates a conventional helicopter 10 having a fuselage 12 with a side access panel 14. Nose-mount frame 16 is suspended beneath the helicopter fuselage for supporting a WESCAM-type gyro-stabilized camera pod 18. The helicopter has skid means 20 mounted in the conventional manner for landing and take-off. The helicopter has a main rotor 22 that is rotated about a generally vertical axis 24.

Counter-weight 26 is internally mounted within the helicopter fuselage and for illustrative purposes weighs about 150 pounds. The counter weight is adjusted in weight and location rearward of axis 24 to balance the added weight of the camera-carrying pod and frame on the fuselage. A combination of lead shot and auxiliary equipment is used for the counter weight.

As is well known, the pod is normally controlled from an internal console in the helicopter by a cable 28.

Figure 2:
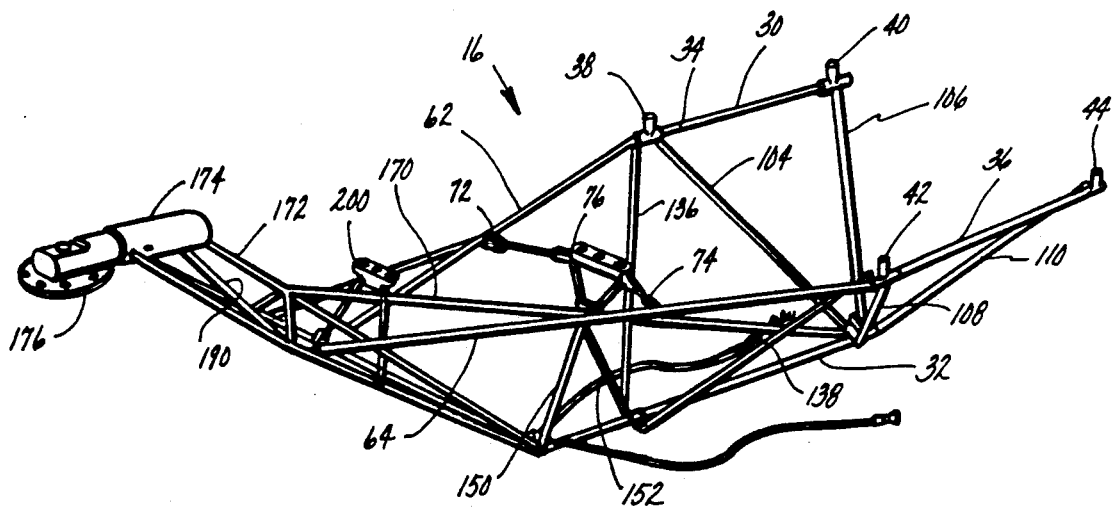
FIG. 2 is a view of the nose mount separated from the helicopter and the camera pod.

FIG. 2 illustrates nose-mount frame 16 separated from both the helicopter and the pod.

The nose-mount frame comprises an upper frame structure 30 and a lower frame structure 32. The upper frame structure, referring to FIGS. 2, 8 and 9, has a pair of horizontal, parallel, tubular frame members 34 and 36. A pair of tubular connector device 38 and 40 are mounted at, respectively, the forward and the rear ends of frame member 34. A pair of tubular connector device 42 and 44 are mounted at, respectfully, the forward end and the rear end of frame member 36.

Referring to FIG. 6, tubular connector device 42 and 44 are identical to one another, each comprising a vertical tubular plug member 48 and a horizontal tubular member 50, joined in a T-shaped configuration. The lower horizontal members of connectors 38 and 42 are mounted in a slip fit on frame members 34 and 36. Connectors 40 and 44 are welded to the rear ends of the horizontal frame members.

Each vertical tubular member 48 has aligned opening means 52.

The helicopter has four existing step-mounting brackets. A typical bracket assembly is illustrated at 54 in FIG. 10, and includes a bracket 56 having a downwardly directed, tubular socket member 58 that normally receives the upper end of a step assembly. The step assembly is removed to provide a socket that telescopically receives the upper end of vertical tubular member 48. Each existing step bracket receives one of the four tubular members 48. Nut and bolt fastener means 60 extend through the opening in socket member 58, and opening means 52 to form an attachment with member 48. The upper frame structure is attached to the four step brackets on the opposite sides of the fuselage by connectors 38, 40, 42 and 44, shown in FIG. 2.

Still referring to FIG. 2, a pair of forward tubular horizontal frame members 62 and 64 have their rear ends welded to, respectively, the forward ends of frame members 34 and 36.

Referring to FIG. 9, the forward end of frame member 64 threadably carries clevis 66. Similarly, clevis 70 is threadably connected to the forward end of tubular member 62.

Referring to FIG. 8, a connecting ear 72 is welded to the midsection of frame member 62. A similar connecting ear 74 is welded to the midsection of frame member 64. An angular mounting bracket 76 is fastened to the fuselage at the existing aft attachment point of the anti-torque bellcrank inspection panel. Bracket 76 is pivotally connected to one end of a short truss 78. A clevis 80 is threadably mounted on the opposite end of truss 78. Threaded fastener means 82 connects clevis 80 to connecting ear 72.

Similarly, one end of short truss 84 is pivotally connected to the opposite end of bracket 76. The opposite end of truss 84 carries a clevis 86. Nut and bolt means 88 pivotally connect truss 84 to connecting ear 74.

Thus, the forward end of the upper frame is connected to the helicopter nose by bracket 76.

Figure 7:
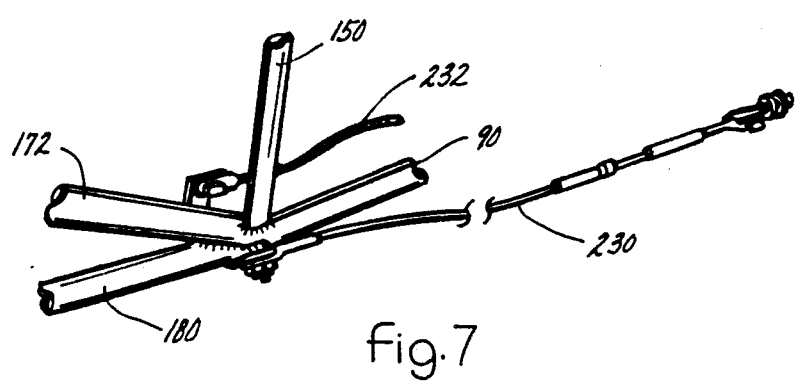
FIG. 7 is a view of the joint between the forward end of the lower frame member, showing the safety cables.

Referring to FIGS. 4, 5 and 7, lower frame structure 32 includes a lower horizontal tubular frame member 90. FIG. 5 shows the rear end of frame member 90. Frame member 90 is supported parallel to the longitudinal axis of the helicopter, beneath the midsection of the fuselage. A bracket 92, having a pair of apertured ears 94 and 96, is attached to the extreme rear end of frame member 90. A second bracket 98, having a pair of apertured ears 100 and 102, is mounted on frame member 90 adjacent and forward of bracket 92.

Referring to FIGS. 2 and 5, four tubular trusses struts 104, 106, 108 and 110 suspend the rear end of frame member 90 in a position between and beneath connectors 38, 40, 42 and 44 of the upper frame. The lower ends of these 4 trusses are illustrated in FIG. 5. Clevis means 112, 114, 116 and 118 are threadably, adjustably connected to the lower ends of trusses 104, 106, 110 and 108, respectively.

Nut and bolt fastener means 120 and 122 connect clevis means 12 and 118 to ears 94 and 96, respectively. Similarly, nut and bolt fastener means 124 and 126 connect clevis means 114 and 116 to ears 100 and 102, respectively. Since each of the clevis means is threadably fastened to the lower end of its respective truss, appropriate adjustments may be made to the over-all length of each truss when the frame is being connected to the step brackets of the helicopter.

The upper ends of trusses 104, 106, 108 and 110 are welded to upper frame members 34 and 36 adjacent connectors 38, 40, 42 and 44, respectively.

Referring to FIG. 4, bracket means 130 is attached to frame member 90 a distance forward of the rear end of frame member 90 generally corresponding to the distance between connectors 38 and 40. Bracket means 130 has a pair of apertured ears 132 and 134. Another pair of trusses 136 and 138 have their lower ends carrying adjustable, threadably-mounted clevis means 140 and 142, respectively. Nut and bolt fastener means 144 and 146 connect the lower ends of the trusses 136 and 138 to ears 132 and 134, respectively. Nut and bolt means 148 connect the upper ends of trusses 136 and 138 to the forward ends of frame members 34 and 36, respectively. Trusses or struts 136 and 138 are rearwardly inclined.

Referring to FIGS. 2 and 4, a pair of tubular trusses 150 and 152 are joined to lower frame member 90 to form an inverted "V". The lower end of truss 150 is welded to the forward end of frame member 90. The lower end of truss 152 is welded to frame member 90, adjacent bracket means 130.

The upper ends of trusses 150 and 152 are joined, as illustrated in FIG. 8. A rod 154, having a forked end 156, is pivotally connected to bracket 76. Rod 154 has a lower end with clevis means 158 connected by a pin 160 to the upper end of truss 150. Similarly, rod 162 has its upper end pivotally connected by forked end 164 to the opposite end of bracket 76. The lower end of rod 162 has clevis means 166 connected by pin means 168 to the upper end of truss 152. Trusses 150 and 152 are disposed in a vertical plane extending upwardly from frame member 90. They cooperate in suspending the forward end of lower frame structure 32 to the helicopter nose by means of bracket 76.

Referring to FIGS. 2, 5 and 9, an elongated, diagonal truss 170 has its lower end attached to the rear end of horizontal bar 90 adjacent ear 98. Connected to the forward end of truss 170 is an inclined truss 172 having its lower end attached to the forward end of frame member 90 adjacent its connection with the lower end of truss 150. The upper end of truss 172 is attached to a cylindrical support beam 174 which, in turn, supports an apertured support plate 176 adapted to be fastened to camera pod 18.

Referring to FIGS. 7 and 9, a pair of trusses 178 and 180 have their lower ends joined to the forward end of frame member 90, adjacent its connection with truss 150. Trusses 178 and 180 diverge from frame member 90 and have their upper ends welded to the opposite ends of cross bar 182.

A pair of diverging short legs 184 and 186 have their upper ends joined to truss 170, and their lower ends joined to the upper ends of trusses 178 and 180, respectively. Short legs 184 and 186 are connected to truss 172 at a position adjacent its joint with the upper end of truss 170.

An inclined truss 190 has its lower end joined to the midsection of cross bar 182, and its upper end attached to cylindrical support 174, as illustrated in FIGS. 2 and 3.

A pair of trusses 192 and 194 are joined to the upper ends of trusses 178 and 180, respectively. The upper ends of trusses 192 and 194 are joined to the lower side of the forward end of cylindrical support member 174. The forward end of the lower frame is suspended from a forward nose bracket 200, which is fastened to the fuselage at the existing aft attachment point for the landing light cover.

Support rod 202 has a clevis member 204 connected by nut and bolt fastener means 206 to truss 180. Clevis 208 and nut and bolt fastener means 209 connect rod 202 to the near side of bracket 200, as viewed in FIG. 9.

A second rod 211 has a clevis 212 pivotally connected to the opposite side of bracket 200. The lower end of rod 211 is pivotally connected by clevis means 213 to truss 178.

Referring to FIG. 9, a connecting pad 214 is connected to clevis 66 and clevis 70 in a position below bracket 200.

Referring to FIGS. 2, 8 and 9, an outboard tubular brace 210 has one end connected to frame member 62 adjacent ear 72. The forward end of brace 210 is connected by clevis and pin means 216 to the foot of leg 184.

The rearward end of a second outboard tubular brace 220 is attached to frame member 64 adjacent ear 74. The forward end of brace 220 is connected by clevis and pin means 222 to an ear 224 attached to the foot of leg 186.

The camera pod insert is preferably fabricated from an aluminum alloy while the trussed upper and lower frame structures are fabricated from a chrome molybdenum tubing.

The lower ends of a pair of stainless steel cables 230 and 232, as illustrated in FIG. 7, are attached to the forward end of frame member 90. The upper cable ends are attached to the helicopter's existing forward tie down lugs (not shown).

Thus, I have described in detail a novel truss-type structure for mounting a gyro-stabilized camera pod forward of the nose of a helicopter, within the pilot's view. The pod is in a position offering a wider field of view than a side-mounted pod.

The truss-type structure can be removed from the aircraft by disconnecting the safety cables, brackets 76 and 200, and removing the rearward end of the frame from the step-mounting devices. The pod can be precisely adjusted with respect to the aircraft because the lower frame structure is connected to the upper frame structure by several adjustable clevis devices.

Having described my invention, I claim:

1. Apparatus for mounting a remotely-controlled camera-carrying pod on a helicopter, wherein the helicopter includes a fuselage having a longitudinal centerline; said fuselage including a front nose section, an undersurface, two side surfaces, and step-support brackets on said side surface: said apparatus comprising a unitary truss structure having a rear section adapted to extend longitudinally along the undersurface of the fuselage, and a front section adapted to extend upwardly along the front nose section of the fuselage; plural separate connector means carried by the rear section of said truss structure for removable connection to each of said step-support brackets a bracket attachment means carried by the front section of said truss structure for attaching said truss structure to the nose section of the fuselage; and a pod-attachment means carried by the front section of said truss structure on the longitudinal centerline of the fuselage.

2. Apparatus as defined as claim 1, and further comprising a counterweight means disposed in the fuselage for counteracting the effect of the weight of the camera-carrying pod on the center of gravity of the fuselage.

3. Apparatus as defined in claim 1, wherein each of said step-support brackets comprises a downwardly-extending socket; each of said connector means comprising a plug member adapted for insertion into an associated socket.

4. Apparatus as defined in claim 1, wherein the rear section of said truss structure comprises two longitudinally-extending upper frame members adapted to extend along opposite side surfaces of the fuselage at approximately a level of the step-support brackets, and a lower longitudinally-extending frame member adapted to extend along the undersurface of the fuselage on the fuselage centerline.

5. Apparatus as defined in claim 4, wherein said truss structure further comprises a plural number of struts extending between each of said longitudinally-extending upper frame members and the lower longitudinally-extending frame member; each strut having an adjustable length clevis means pivotally attached to the lower frame member, whereby said lower frame member can be adjusted relative to the upper frame members during the operation of attaching the truss structure to the helicopter fuselage.

6. Apparatus as defined in claim 4, wherein the front section of said truss structure comprises a longitudinal-extending support beam located on the fuselage centerline, said beam having a front end and a rear end, a first inclined elongated truss element means having one end thereof connected to the rear end of said beam, and a second inclined elongated truss element means having one end thereof connected to the front end of said beam, whereby the beam is braced against overturnment due to forces imposed thereon by the camera-carrying pod;

said pod-attachment means being attached to the front end of the said beam.

7. Apparatus as defined in claim 4 and further comprising two safety support cables (230 and 232) trained between the truss structure and the helicopter fuselage; each of said cables having a lower end thereof connected to said lower frame member at the front end thereof.

8. Apparatus for mounting a remotely-controlled camera-carrying pod on a helicopter, wherein the helicopter includes a fuselage having a longitudinal centerline; said fuselage including a front nose section, an undersurface, and two side surfaces: said apparatus comprising a unitary truss structure having a rear section adapted to extend longitudinally along the undersurface of the fuselage, and a front section adapted to extend upwardly along the front nose section of the fuselage; plural separate connector devices carried by the rear section of the truss structure for removable attachment to opposite side surfaces of the fuselage, and a bracket means carried by the front section of said truss structure for attaching said truss structure to the nose section of the fuselage; and a pod-attachment means carried by the front section of said truss structure on the longitudinal centerline of the fuselage.

9. Apparatus as defined in claim 8, wherein the rear section of said truss structure comprises two longitudinally-extending upper frame members adapted to extend along opposite side surfaces of the fuselage, and a lower longitudinally-extending frame member adapted to extend along the undersurface of the fuselage on the fuselage centerline; said connector devices being carried by the upper frame members.

10. Apparatus as defined in claim 9, wherein there are two connector devices carried by each of said upper frame members at longitudinally-spaced points therealong.

11. Apparatus as defined in claim 9, wherein said truss structure further comprises a plural number of struts extending between each of said frame members and the lower frame member; each of said struts having an adjustable length clevis means pivotally attached to the lower frame member, whereby said lower frame member can be adjusted relative to the upper frame members during the operation of attaching the truss structure to the helicopter fuselage.

12. Apparatus as defined in claim 4, wherein the front section of said truss structure comprises a longitudinally-extending support beam located on the fuselage centerline, said beam having a front end and a rear end, a first inclined elongated truss element means having one end thereof connected to the rear end of said beams, and a second inclined elongated truss element means having one end thereof connected to the front end of said beam, whereby the beam is braced against overturnment due to forces imposed thereon by the camera-carrying pod; said pod-attachment means being attached to the front end of said beam.

* * * * *